UNITED STATES PATENT OFFICE.

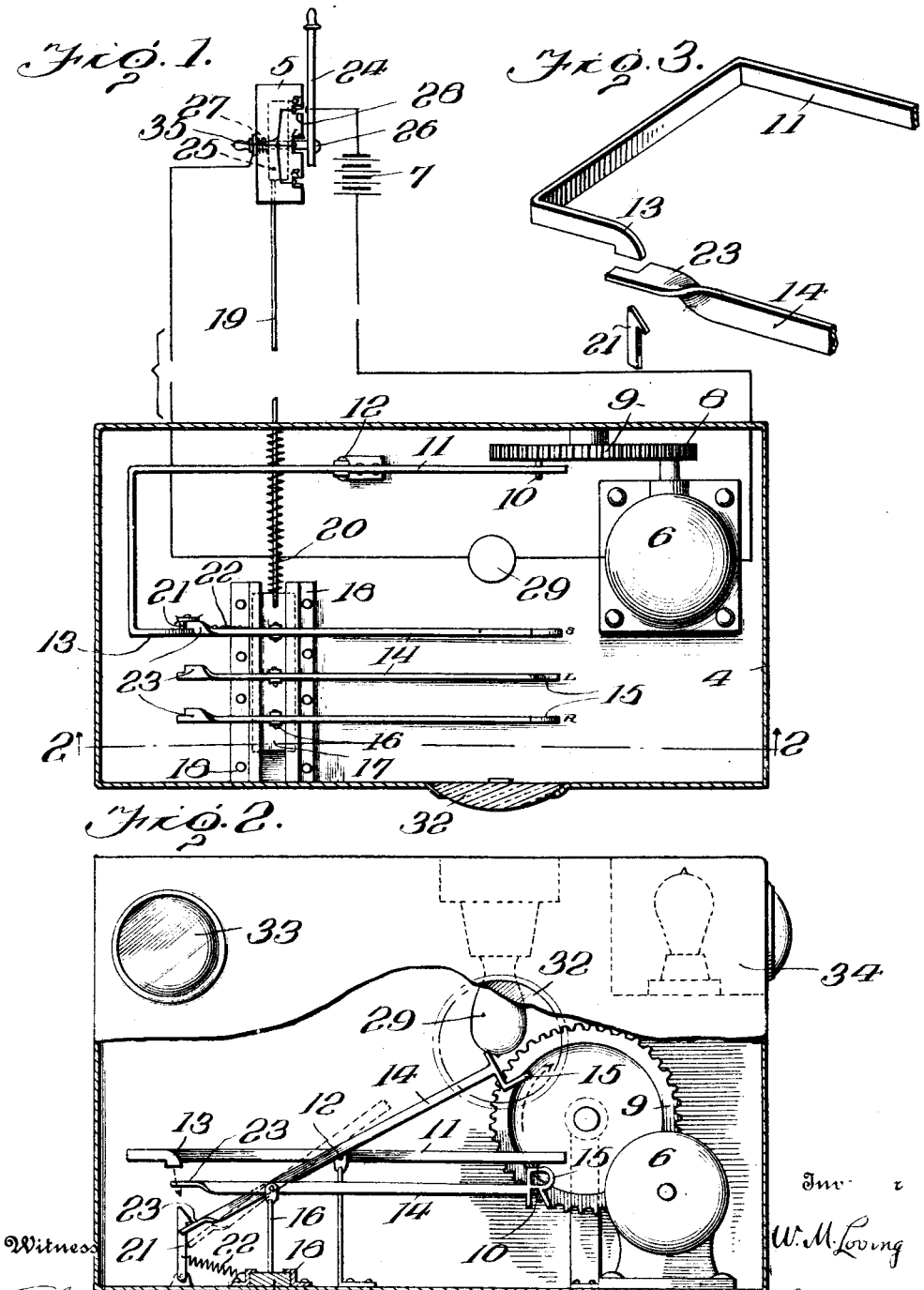

WARRENTON M. LOVING, OF RICHMOND, VIRGINIA.

SIGNAL DEVICE FOR MOTOR-VEHICLES.

1,180,860.  Specification of Letters Patent.  Patented Apr. 25, 1916.

Application filed September 7, 1915. Serial No. 49,313.

*To all whom it may concern:*

Be it known that I, WARRENTON M. LOVING, a citizen of the United States, residing at No. 207 East Leigh street, in the city of Richmond, in the county of Henrico and State of Virginia, have invented certain new and useful Improvements in Signal Devices for Motor-Vehicles, of which the following is a specification.

This invention relates to signaling apparatus and in its more intense aspect to signal devices particularly applicable to motor vehicles and the like for the purpose of advising those in the rear of such vehicles of the future course or procedure intended to be taken by the leading vehicle.

While the invention is subject to numerous applications, it will hereinafter be described with relation to its application to a motor vehicle.

One of the objects of the present invention is to provide a simple and practical device of the above general character which will be cheap to manufacture and install.

A further object is to provide an efficient and reliable mechanism of the above character adapted to attract and hold the attention of the driver of a vehicle following.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a sectional plan view, partially diagrammatic, showing the general arrangement of the various parts of the device; Fig. 2 is an elevational view partly in section showing the internal mechanism of the signal box, certain parts being removed or shown diagrammatically for the sake of clearness. Fig. 3 is a detail view.

Referring now to the drawing in detail and more particularly to Fig. 1, 4 denotes a box or receptacle adapted to contain the operating signal mechanism and is positioned at the rear of the vehicle, preferably adjacent the position usually occupied by the license number and rear signal light. There is denoted at 5 what will hereinafter be termed the selective mechanism which is preferably positioned adjacent the driver's seat and within his convenient control. It is, of course, to be understood that if the invention is put to a different use, such, for example, as a traffic regulator at street intersections, these parts, would, of course be slightly modified and differently located as might be necessary to suit the purposes to which the device is put. This box 4 contains a motor 6 connected with any suitable source of electric current, such, for example, as shown diagrammatically by batteries 7 in Fig. 1. A pinion 8 is adapted to mesh with a gear 9 mounted on the side of the box and provided with a pin 10 near its periphery adapted to engage the end of a lever 11 pivoted at 12 near its center. The opposite end of this lever is of L-shaped construction and is provided with an actuating tooth 13 adapted to engage any one of a plurality of semaphores 14 carrying suitable characteristic signals 15 at their opposite ends. These semaphores or levers 14 are pivotally mounted near their centers 16 upon a movable block 17 sliding in suitable guides 18. This block 17 is moved endwise by means of the selective mechanism 5 by a pull wire 19 against the action of return spring 20, as will hereinafter be more fully explained. A catch 21 is mounted in the bottom of the box and is held in predetermined position by means of a spring 22 whereby it will engage a lateral projection 23 on the semaphore 14 when the latter is depressed.

The selective mechanism comprises a hand lever 24 carrying in its lower end a drum 25 about which the pull wire 19 leading to the block 17 is adapted to wind as the lever is swung laterally from the position shown in Fig. 1. This drum is so mounted upon a stud 26 or the like as to permit movement in the direction of its axis against the action of a spring 27, thereby to permit the lever 24 to enter any one of the three recesses 28 in the casing of the box 4. As the lever is moved over, it will carry the block 17 a corresponding distance and cause the ends of the levers 14 to properly coact with the actuating tooth 13 of the lever 11.

Assuming these semaphores to be marked with the characteristic letters S, R and L denoting "stop", "right" and "left" respectively, then as the selective mechanism is actuated to the second recess R, for example, it will carry the corresponding semaphore into alinement with the end 13 previously mentioned. Each of these recesses is provided with a contact as shown diagrammatically in Fig. 1 and as the actuating lever 24 is moved inwardly, it will close the circuit to start the motor 6 and light an incandescent bulb 29 preferably suspended from the cover or top of the box and opposite a window 32 in the outer side. As the motor starts, the gear wheel 9 will be rapidly rotated and the pin 10 carried thereby, will cause the lever 11 to oscillate up and down about its pivot 12. As the rear end 13 of the lever moves downwardly, it will engage the upper surface of the semaphore 14 and depress the same, until the catch 21 coacts with the offset 23 of the lever, as shown in Fig. 3. This will hold the distinctive signal carried at its opposite end between the light and the window. Now as the gear continues to rotate the end 13 of the lever will at each time depress the end of the semaphore and cause the distinctive signal to oscillate back and forth in the path of light thus causing a flickering, which will more quickly catch the eye of the operator of the following vehicle.

The signal box, of course, may be provided with auxiliary lights 33 and 34 to serve the purpose of the usual rear light and license light respectively. These lights are preferably located in the upper corners of the signal box and may be actuated from a separate source of electric power. An auxiliary light 35 may also be placed adjacent the selective mechanism in circuit with light 29 to act as a "telltale", thus informing the operator as to the correct operation of the signal mechanism at the rear of the vehicle. For instance, should the light 29 burn out, the light 35 in series therewith would, of course, also go out, while if the motor 6 becomes short circuited or ceased to run, the light would glow with a brilliancy which would immediately advise the operator that the device was not in operation.

It is thus seen that the present invention comprises a simple and practical device adapted to accomplish all of the objects and advantages above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claim.

I claim:

In a device of the character described, in combination, a signal mechanism comprising a source of light, a plurality of semaphore arms carrying distinctive signals adapted to be moved into juxtaposition with said source of light, a motor and intervening mechanism adapted to move a signal to such position and rapidly oscillate it adjacent the source of light, and selective mechanism convenient to the operator for manually moving the desired semaphores into predetermined position with respect to the motor operated mechanism.

In testimony whereof I affix my signature in presence of two witnesses.

WARRENTON M. LOVING.

Witnesses:
C. BLANCHE DREW,
M. T. KRING.